Figure 1:
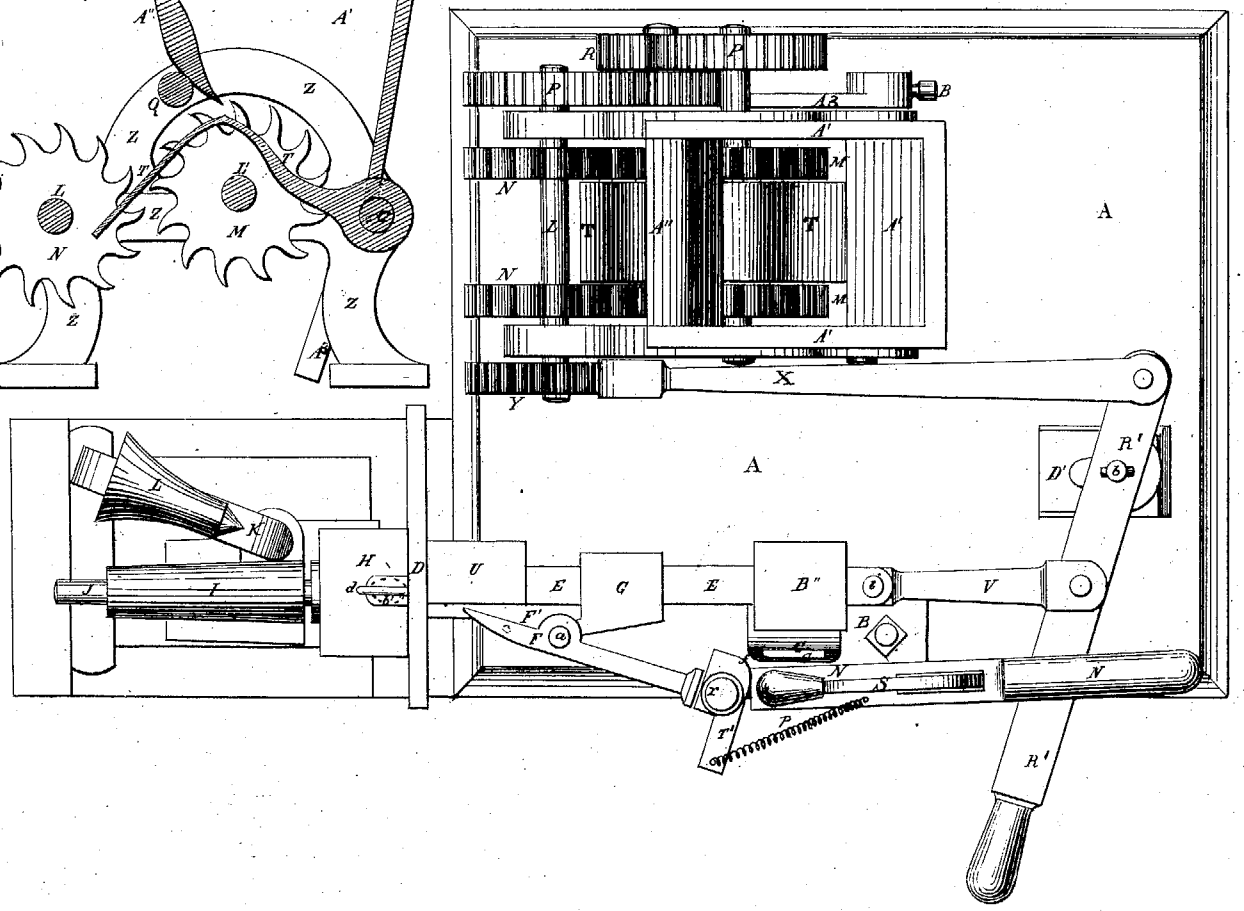

2 Sheets--Sheet 1.

J. RUEGG.

Improvement in Brush-Making Machines.

No. 4,978. Reissued July 16, 1872.

WITNESSES:

Rob. N. McHenry
Chas B. Stewart

INVENTOR:

John Ruegg
By his Attys
Amos Broadin & Co.

2 Sheets--Sheet 2.

J. RUEGG.

Improvement in Brush-Making Machines.

No. 4,978.

Reissued July 16, 1872.

WITNESSES:

Rich. N. McHenry

Chas B. Stewart

INVENTOR:

John Ruegg

By his Attys

Amos Broadwy

UNITED STATES PATENT OFFICE.

JOHN RUEGG, OF ST. LOUIS, MISSOURI, ASSIGNOR, BY MESNE ASSIGNMENTS, TO RICHARD C. FELLOWS.

IMPROVEMENT IN BRUSH-MAKING MACHINES.

Specification forming part of Letters Patent No. 30,693, dated November 20, 1860; reissue No. 4,978, dated July 16, 1872.

SPECIFICATION.

Be it known that I, JOHN RUEGG, of the city and county of St. Louis and State of Missouri, have invented a new and Improved Machine for Making Brushes; and I do hereby declare that the following is a full, clear, and exact description of the same, reference being had to the annexed drawing making part of this specification, in which—

Figure I is a top view of my said invention; Fig. II, a side elevation; and Fig. III, a part thereof, to be hereinafter explained.

To enable others skilled in the art to which my invention appertains to make and use the same, I will now proceed to describe the construction and operation thereof.

Similar letters of reference represent corresponding parts of the different figures of the drawing annexed.

Figure 3:
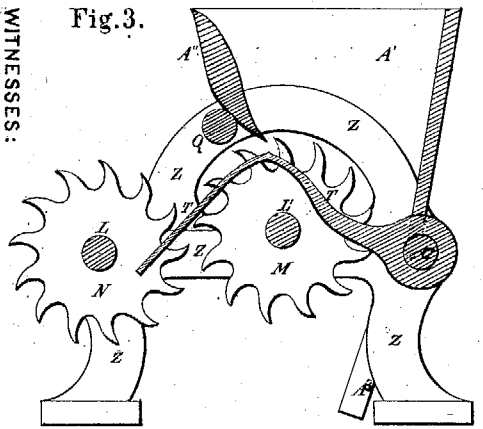

The frame of my machine is shown upon the drawing by A. It consists of a flat piece of plank, upon which the different parts of the machine are fixed. The machine aforesaid consists of two principal parts, viz.: One for dividing the bristles, or other material out of which the brush is to be made, into small tufts, and one for fixing these tufts in the brush-back, and thus forming the brush. The part which divides the bristles is shown by Figs. 1 and 3. These parts, however, do not constitute separate machines, the one being an essential part of the other. I have divided the machine into parts only that I may the better describe it, and that the mind may be easily brought to understand the mode of operation.

First, as to the part which divides the bristles into tufts. This part is composed of a frame shown by Z, Figs. 3 and 1. The said frame consists of two flat pieces of metal, made in form as shown in Fig. 3, and united by means of bolts or braces, one of which is shown by Q. The said frame, after being united as aforesaid, is fixed to the bed-plate or main frame A, after which a hopper-box is fixed upon it (as shown by A′) for the purpose of receiving the bristles. But before the hopper-box is fixed on the frame there are three shafts arranged across it, about in the relation shown by L L′ and C. Upon two of these shafts—viz., L and L′—there are four wheels, N N and M M, fixed, in the peripheries of which are cut a series of notches in the nature of claws. There are two wheels on each shaft, and the said wheels are so arranged as to bring the claws cut in their peripheries directly opposite each other and on a line with the center or axis of the shaft. The said shafts are made to revolve both in the same direction, and they are so arranged with respect to each other as to cause the claws cut in the peripheries of the wheels M and N to just clear each other as they rotate about their respective axes. Upon the shaft C a gauge, T, is fixed, the position of which is regulated by means of a lever, $A^3$, which is fixed upon the same shaft with the gauge, and which is secured in any given position by means of a set-screw, B. Now, the object of these wheels with claws in their peripheries is to divide the bristles into tufts, and the object of the gauge T is to regulate the size of the said tufts. The bristles are put into the receiver or hopper-box $A^1$ parallel with the shafts L $L^1$, and they rest upon the gauge T so that the claws in the periphery of the wheels M M fill as the wheels revolve, and carry a given number of bristles in each claw forward under the lower edge of the front part $A''$ of the hopper-box A. It will thus be seen that the device T performs two functions, one of which is to give support to the bristles as they are moved along, and the other is to determine the quantity of bristles which the separator M shall take from the mass. From the claws of the wheels M M the tufts are delivered to the claws of the wheels N N, which carry them forward to the hand of the workman. The tufts are made large or small by raising or lowering the gauge, as by raising the said gauge the claws in the wheels M M can only partly fill, which will make the tufts small. But by lowering the said gauge the claws are all allowed to fill, and the tufts are enlarged accordingly. The two wheels M M and N N are both made to revolve in the same direction by means of the two cog-wheels P P, both of which mesh into the pinion R. The motion being conveyed through the ratchet-wheel Y, in which a ratchet, X, is made to work, which ratchet is actuated by the lever R′, as will be hereinafter more fully explained. The pinion R is loose on its center-pin, and is a mere intermediate wheel to convey motion from one of the wheels P to the other. The drawing shows the two wheels P P both of the same size. But their relative size may be altered, which will alter the operation of the machine. Thus, by making the wheel P on the shaft L smaller the tufts would be made smaller, because the relative motion of the wheels M and N would be changed. By these means the machine—that is, one machine—can be made to make brushes of different sizes.

Figure 2:
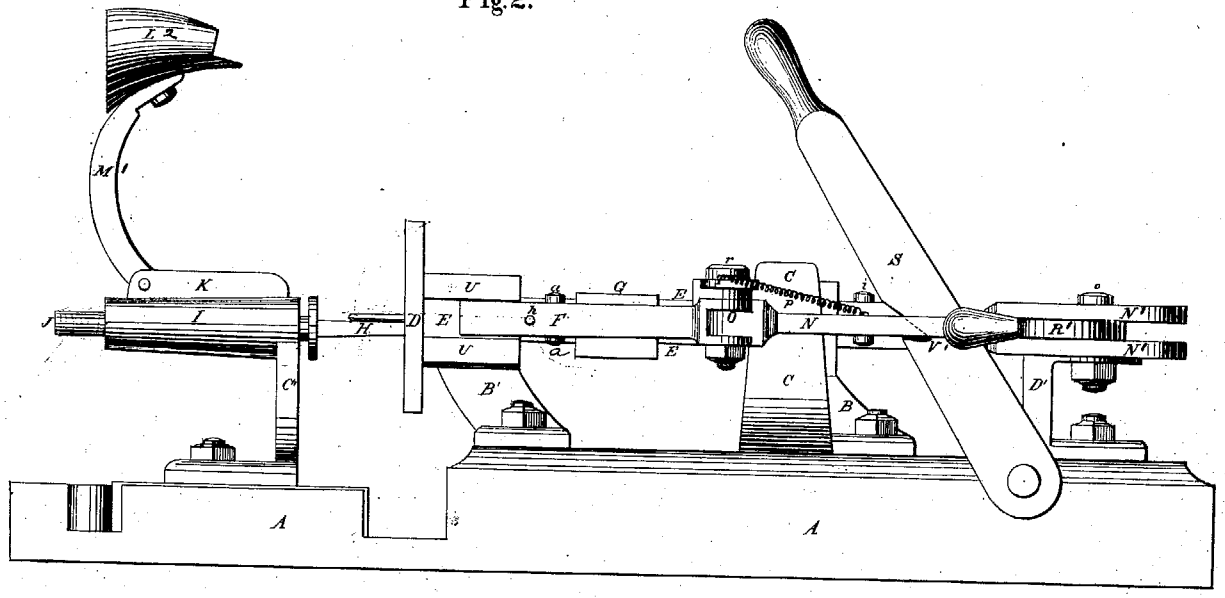

This finishes the explanation or description of that part of the invention which is for dividing the bristles into tufts. The part of the machine which is to put the tufts in the brush-back is constructed and operated as follows: There is first a square parallel rod made, shown in the drawing by E. This rod I shall call the needle-rod. It is supported in two brackets, B′ B, which are bolted to the bed-plate A. The head of the bracket B′ has an open side, so as to form a groove in which the rod is made to work between the top and bottom sides U U, which thus exposes the front part of the end of the needle-rod. This needle-rod is operated by means of a lever, R′, which has its fulcrum at *b* in a bracket, D′, being connected to the lever by means of a link, V, so that the said rod can move on a right line without being influenced by the vibrations of the lever. Upon the said needle-rod a slide, G, is placed, so as to slide freely on the said rod and between the two brackets. This slide has an extension on one end of it, (shown by F′,) which constitutes one of the jaws of a pair of pinchers, the other jaw, F, being hinged to this by means of a pin, *a*. The tail end of the jaw F of the said pinchers is joined to a rod, N, at D, by means of a pin, as shown. On the pin *r*, which forms the nucleus of the joint O, a small cam-lever, T′, is fixed, the cam end of which acts against a stiff spring, *c c*, fixed to the bed-plate, and the lever end of which is attached to a small coil-spring, P, one end of which is fixed to the rod N. The outer end of the rod N is made to straddle the lever R, as shown by N′ N′, and the lever S is made to pass through a slot made in the said rod. The lever S has a notch cut in its edge, as shown at V′ in dotted lines, so as to hold the pinchers F forward while the needle-rod is drawn back, as will be hereafter described. The object of the cam-lever is to throw out the tail of the pincher-jaw F so as to close the jaw and hold it closed from the time it is pressed forward until it is drawn back clear of the spring *c*, which relaxes the jaws of the pinchers and allows the spring P to draw the cam-lever back to its prime position. In the end of the needle-rod the needle *d* is fixed, in the end of which a groove is made, which groove is extended longitudinally in the periphery of the needle, up to the needle-bar, or nearly there; and in the face of the needle-rod a groove is cut which extends back from the end to the jaws of the pinchers; and in the jaw F of the pinchers a hole is bored, (shown by *h*, Fig. 2.) Through this hole the wire for securing the tufts is passed and carried forward along the groove in the needle-rod, and also in the needle, the end thus carried forward being then fastened in the brush-back, which is clamped against the head of the bracket B′ by means of a wedge-like clamp, H, which is pressed forward by means of a spiral spring which is coiled around the tail J of the clamp and on the head I, through which the said tail passes and which is bolted to the bed-plate. This head has also a lug cast on one side of it, on which an arm, K, is fixed, to which is hinged the arm M′, on the end of which the feed-nozzle L′ is fixed. This feed-nozzle has an angular point on its lower side for the purpose of opening the loop formed by the wire and to guide the tuft of bristles down through the loop. Now let the back of the brush be introduced between the head B′ and the clamp H, and let the end of the wire be passed through the hole *h* and through the groove in the needle and needle-rod and fixed in the back of the brush, and let the pinchers F F′ be thrown forward by the lever S in the position shown in the drawing; then, by means of the lever R′, throw the needle-bar and needle forward, which will draw the wire through the hole in the brush-back, where the tuft is to be put, the needle passing through the hole. Then draw back the needle, which will leave the wire in the form of a loop on the front side of the brush-back. Then bring down the feed-nozzle, and the angular point thereof will strike in the loop and upon it. Now put the end of the tuft down in the nozzle and through the loop. Then slightly raise the feed-nozzle and draw back on the lever S, which will bring the cam-lever T′ against the spring *c*, which will close the jaw of the pinchers on the wire, and thus draw the loop tight around the tuft and draw the double of the tuft through the hole in the brush-back, which is then moved forward so as to bring the succeeding hole in the said back in front of the needle, which is then shoved forward again and the above operation repeated until the brush is finished, or rather until the bristles are all on. The oval dotted line *b′*, Fig. 1, shows the loop when the needle is drawn back. While the tufts are thus put on the brush-back so as to form the brush the tufts themselves are formed by the action of the ratchet *x* on the wheel *y*, which gives motion to the dividing part of the machine, as before described.

Having thus described my invention, what I desire to secure by Letters Patent is—

1. The use of the nozzle, constructed substantially as described, in combination with the needle, for the double purpose of opening the loop and feeding the bristles through.

2. I claim the combination of the spring-clamp H with the head U U, whereby the brush-block is held up against the said head while the needle operates through it.

3. I claim the combination of the pinchers with the needle-bar, substantially in the manner described, for the purpose specified.

4. I claim opening and closing the pinchers by means of the cam-lever T′ and spring *c*, as set forth.

5. I claim the combination of the levers S and R′ with the needle-bar and the pinchers, whereby those two devices are made to operate as described.

6. A separator, M, for penetrating a mass of bristles or other filaments and separating a prescribed quantity from the mass, in combination with a table or supporting-bed, T, for the bristles, substantially as described.

7. A separator, M, for penetrating a mass of bristles or other filaments and separating a prescribed quantity from the mass, in combination with an adjustable gauge, A″, and supporting-bed, T, substantially as described.

8. A hopper, A′, for containing a mass of bristles or other filaments, in combination with a separator, M, for detaching a prescribed quantity of bristles from the mass, substantially as described.

9. I claim the lever R′, in connection with the claw-wheels and the needle-bar, whereby the bristles are divided into tufts and the tufts put into the brush-back simultaneously.

JOHN RUEGG.

Witnesses:

EDWARD WACHTER,
THOMAS B. TAYLOR.